(12) United States Patent
Benchetrit (10) Patent No.: US 12,158,919 B2
(45) Date of Patent: Dec. 3, 2024

(54) AUTOMATED CATEGORIZATION OF GROUPS IN A SOCIAL NETWORK

(71) Applicant: Bumble IP Holdco LLC, Wilmington, DE (US)

(72) Inventor: Ronen Benchetrit, London (GB)

(73) Assignee: Bumble IP Holdco LLC, Wilmington, DE (US)

( * ) Notice: Subject to any disclaimer, the term of this patent is extended or adjusted under 35 U.S.C. 154(b) by 0 days.

(21) Appl. No.: 18/145,621

(22) Filed: Dec. 22, 2022

(65) Prior Publication Data

US 2023/0205831 A1 Jun. 29, 2023

Related U.S. Application Data

(60) Provisional application No. 63/294,528, filed on Dec. 29, 2021.

(51) Int. Cl.
*G06F 16/9536* (2019.01)
*G06Q 50/00* (2024.01)

(52) U.S. Cl.
CPC ......... *G06F 16/9536* (2019.01); *G06Q 50/01* (2013.01)

(58) Field of Classification Search
CPC .............................. G06F 16/9536; G06Q 50/01
See application file for complete search history.

(56) References Cited

U.S. PATENT DOCUMENTS

| | | | |
|---|---|---|---|
| 8,375,068 B1 | 2/2013 | Platt et al. | |
| 8,762,047 B2 | 6/2014 | Sterkel et al. | |
| 8,793,593 B2 | 7/2014 | Rasmussen et al. | |
| 8,849,721 B2 | 9/2014 | Fedorov et al. | |
| 8,909,515 B2 | 12/2014 | O'Neil et al. | |
| 9,032,290 B2 | 5/2015 | Shepherd et al. | |
| 9,092,533 B1 | 7/2015 | Demathieu | |
| 9,183,574 B2 | 11/2015 | Bosworth et al. | |
| 9,225,755 B2 | 12/2015 | Sitrick et al. | |
| 9,330,366 B2 | 5/2016 | Sitrick et al. | |
| 9,336,553 B2 | 5/2016 | Rubinstein et al. | |
| 9,380,087 B2 | 6/2016 | Carduner et al. | |
| 9,443,225 B2 | 9/2016 | Olsen et al. | |
| 9,471,943 B2 | 10/2016 | Iannaccone et al. | |
| 9,508,102 B2 | 11/2016 | Thibaux et al. | |

(Continued)

OTHER PUBLICATIONS

International Search Report and Written Opinion in International Appln. No. PCT/IB2022/062692, mailed Mar. 21, 2023, 14 pages.

*Primary Examiner* — Jay A Morrison
(74) *Attorney, Agent, or Firm* — Fish & Richardson P.C.

(57) ABSTRACT

A method for automatically categorizing groups of users in a social network, and using the categories to propose matches between groups or users and groups includes accessing content shared within a group in a social network application, processing the shared content with at least one machine learning model to determine labels for the content, determining categories for the group based on the labels for the content, accessing matching criteria for a user of the social network application, generating a match between the user and the group based on the matching criteria for the user and the categories for the group, supplying data indicative of the match to a client device of the user, receiving a match acceptance from the client device, and in response to receiving the match acceptance, providing the user access to the group in the social network application.

18 Claims, 6 Drawing Sheets

(56) References Cited

U.S. PATENT DOCUMENTS

| | | | |
|---|---|---|---|
| 9,544,382 B2 | 1/2017 | Bosworth et al. |
| 9,594,534 B2 | 3/2017 | Sasaki et al. |
| 9,773,284 B2 | 9/2017 | Huang et al. |
| 9,781,123 B2 | 10/2017 | Kim et al. |
| 9,785,976 B2 | 10/2017 | Guo et al. |
| 9,798,440 B2 | 10/2017 | Piantino et al. |
| 9,923,981 B2 | 3/2018 | Mcdonald et al. |
| 9,934,334 B2 | 4/2018 | Pryor |
| 9,934,424 B2 | 4/2018 | Bostick et al. |
| 9,936,127 B2 | 4/2018 | Todasco |
| 9,946,430 B2 | 4/2018 | Lessin et al. |
| 9,952,881 B2 | 4/2018 | Sharma et al. |
| 9,959,250 B2 | 5/2018 | Marra et al. |
| 9,996,622 B2 | 6/2018 | Lyndersay et al. |
| 10,120,945 B2 | 11/2018 | Eulenstein et al. |
| 10,147,107 B2 | 12/2018 | Alonso et al. |
| 10,191,927 B2 | 1/2019 | Marra et al. |
| 10,229,219 B2 | 3/2019 | Owens et al. |
| 10,242,067 B2 | 3/2019 | Piantino et al. |
| 10,275,420 B2 | 4/2019 | Aharony et al. |
| 10,303,727 B2 | 5/2019 | Marra et al. |
| 10,311,365 B2 | 6/2019 | Ruffner et al. |
| 10,318,982 B2 | 6/2019 | Karande et al. |
| 10,325,273 B2 | 6/2019 | Bosworth et al. |
| 10,356,135 B2 | 7/2019 | Wang et al. |
| 10,360,223 B2 | 7/2019 | Li et al. |
| 10,373,200 B2 | 8/2019 | Connolly et al. |
| 10,373,202 B2 | 8/2019 | Kanter et al. |
| 10,373,227 B2 | 8/2019 | Linden |
| 10,397,157 B2 | 8/2019 | Celedonia et al. |
| 10,417,799 B2 | 9/2019 | Tran et al. |
| 10,430,421 B2 | 10/2019 | Keggi et al. |
| 10,475,134 B2 | 11/2019 | Liu et al. |
| 10,484,489 B2 | 11/2019 | El-Arini et al. |
| 10,484,499 B2 | 11/2019 | Lopiano |
| 10,503,463 B2 | 12/2019 | Beaumier et al. |
| 10,504,136 B2 | 12/2019 | Kemp et al. |
| 10,536,511 B2 | 1/2020 | Cohen et al. |
| 10,540,627 B2 | 1/2020 | Eulenstein et al. |
| 10,556,183 B2 | 2/2020 | Lockton |
| 10,565,598 B2 | 2/2020 | Hegeman et al. |
| 10,572,906 B2 | 2/2020 | Goder et al. |
| 10,592,570 B2 | 3/2020 | Li et al. |
| 10,599,955 B2 | 3/2020 | Lee et al. |
| 10,609,085 B1 | 3/2020 | Kanter et al. |
| 10,673,965 B2 | 6/2020 | Obukhov et al. |
| 10,692,093 B2 | 6/2020 | Kiciman et al. |
| 10,698,907 B2 | 6/2020 | Friggeri et al. |
| 10,705,859 B2 | 7/2020 | Paratey et al. |
| 10,706,057 B2 | 7/2020 | Connolly et al. |
| 10,712,811 B2 | 7/2020 | Sun et al. |
| 10,713,267 B1 | 7/2020 | Kympers et al. |
| 10,818,058 B1 | 10/2020 | Gupta et al. |
| 10,846,564 B2 | 11/2020 | Liu et al. |
| 10,867,284 B2 | 12/2020 | Long et al. |
| 10,908,765 B1 | 2/2021 | Hamlin et al. |
| 10,909,601 B2 | 2/2021 | Linden |
| 10,958,456 B1 | 3/2021 | Krug et al. |
| 10,963,132 B2 | 3/2021 | Rivera et al. |
| 10,990,932 B2 | 4/2021 | Photowat |
| 10,997,251 B2 | 5/2021 | Tran et al. |
| 2008/0288494 A1 | 11/2008 | Brogger et al. |
| 2009/0300511 A1 | 12/2009 | Behar et al. |
| 2010/0010822 A1 | 1/2010 | Bal et al. |
| 2011/0258049 A1 | 10/2011 | Ramer et al. |
| 2011/0264527 A1 | 10/2011 | Fitzpatrick et al. |
| 2012/0158850 A1 | 6/2012 | Harrison et al. |
| 2012/0215641 A1 | 8/2012 | Ohki |
| 2012/0297038 A1* | 11/2012 | Mei ................ G06Q 50/01 707/E17.019 |
| 2013/0073568 A1 | 3/2013 | Federov et al. |
| 2014/0006173 A1 | 1/2014 | Li et al. |
| 2014/0040030 A1 | 2/2014 | Winters et al. |
| 2014/0040729 A1 | 2/2014 | Marlow et al. |
| 2014/0040760 A1 | 2/2014 | Randell et al. |
| 2014/0074620 A1 | 3/2014 | Bosworth et al. |
| 2014/0156681 A1 | 6/2014 | Lee et al. |
| 2014/0156747 A1 | 6/2014 | Schatz et al. |
| 2014/0164218 A1 | 6/2014 | Stewart |
| 2014/0172877 A1 | 6/2014 | Rubinstein et al. |
| 2014/0207585 A1 | 7/2014 | Walke |
| 2014/0214529 A1 | 7/2014 | Gross-Baser et al. |
| 2014/0222605 A1 | 8/2014 | Rubinstein et al. |
| 2014/0279069 A1 | 9/2014 | Rubinstein et al. |
| 2014/0280555 A1 | 9/2014 | Tapia et al. |
| 2014/0324895 A1 | 10/2014 | Evans et al. |
| 2014/0365849 A1 | 12/2014 | Ishmael |
| 2015/0039464 A1 | 2/2015 | Seetharam et al. |
| 2015/0101026 A1 | 4/2015 | Kraus |
| 2015/0278367 A1 | 10/2015 | Chang et al. |
| 2015/0363409 A1 | 12/2015 | Wood et al. |
| 2016/0042475 A1 | 2/2016 | Tapia et al. |
| 2016/0148222 A1 | 5/2016 | Davar et al. |
| 2016/0164985 A1 | 6/2016 | Song et al. |
| 2016/0188607 A1 | 6/2016 | Rubinstein et al. |
| 2016/0189234 A1 | 6/2016 | Tang et al. |
| 2016/0267497 A1 | 9/2016 | Li et al. |
| 2017/0068744 A1 | 3/2017 | Taylor et al. |
| 2017/0139888 A1 | 5/2017 | Ramlet et al. |
| 2017/0161277 A1 | 6/2017 | Eulenstein et al. |
| 2017/0262477 A1 | 9/2017 | Carroll |
| 2017/0351773 A1 | 12/2017 | Yung et al. |
| 2018/0131823 A1 | 5/2018 | Iwaki et al. |
| 2018/0145840 A1 | 5/2018 | Advani et al. |
| 2018/0276871 A1 | 9/2018 | Kolli et al. |
| 2018/0314976 A1 | 11/2018 | Miao et al. |
| 2018/0336645 A1* | 11/2018 | Price ................ H04N 21/4661 |
| 2018/0336931 A1* | 11/2018 | Tandon ................ G06V 20/49 |
| 2019/0104101 A1 | 4/2019 | Pique Corchs et al. |
| 2020/0322304 A1 | 10/2020 | Miller |
| 2020/0334283 A1 | 10/2020 | Cook et al. |
| 2020/0364806 A1 | 11/2020 | Wang et al. |
| 2021/0089600 A1 | 3/2021 | Bar Lev et al. |
| 2021/0264541 A1* | 8/2021 | Li ................ G06Q 10/06 |

* cited by examiner

AUTOMATED CATEGORIZATION OF GROUPS IN A SOCIAL NETWORK

CROSS-REFERENCE TO RELATED APPLICATIONS

This application claims priority to and the benefit of U.S. Provisional Patent Application No. 63/294,528, filed on Dec. 29, 2021, the entire content of which is incorporated herein by reference.

TECHNICAL FIELD

This disclosure relates generally to automated categorization of groups, such as groups in a social network.

BACKGROUND

Social network applications are online platforms that enable users who share a common interest to connect with one another. Some social network applications can propose matches between users or group of users, such as potential friends, dating partners, or business partners, among others. Once a proposed match is accepted, matched users may share content with one another electronically using the social application.

SUMMARY

Disclosed are systems, methods, and non-transitory computer-readable storage media for automatically categorizing groups of users in a social network, and using the categories to propose matches between groups or users and groups.

In general, in an aspect, a computer-implemented method includes accessing content shared within a group in a social network application, processing the shared content with at least one machine learning model to determine one or more labels for the content, determining one or more categories for the group based on the one or more labels for the content, accessing matching criteria for a user of the social network application, generating a match between the user and the group based on the matching criteria for the user and the one or more categories for the group, supplying data indicative of the match to a client device of the user, receiving a match acceptance from the client device, and in response to receiving the match acceptance, providing the user access to the group in the social network application.

In general, in an aspect, a system includes one or more processors and one or more storage devices storing instructions executable by the one or more processors to perform operations including accessing content shared within a group in a social network application, processing the shared content with at least one machine learning model to determine one or more labels for the content, determining one or more categories for the group based on the one or more labels for the content, accessing matching criteria for a user of the social network application, generating a match between the user and the group based on the matching criteria for the user and the one or more categories for the group, supplying data indicative of the match to a client device of the user, receiving a match acceptance from the client device, and in response to receiving the match acceptance, providing the user access to the group in the social network application.

In general, in an aspect, one or more non-transitory computer-readable storage media store instructions executable by one or more processors to perform operations including accessing content shared within a group in a social network application, processing the shared content with at least one machine learning model to determine one or more labels for the content, determining one or more categories for the group based on the one or more labels for the content, accessing matching criteria for a user of the social network application, generating a match between the user and the group based on the matching criteria for the user and the one or more categories for the group, supplying data indicative of the match to a client device of the user, receiving a match acceptance from the client device, and in response to receiving the match acceptance, providing the user access to the group in the social network application.

In some implementations, the content includes at least one of text, audio, image, or video data shared within the group.

In some implementations, the group includes one or more users of the social network application, and the content includes content shared by at least one of the one or more users in a communication channel associated with the group.

In some implementations, the communication channel includes at least one of a group chat, a group web page, or a group streaming channel.

In some implementations, the at least one machine learning model is selected from multiple machine learning models based on a type of the content, with the type of content including at least one of text, audio, image, or video.

In some implementations, the method includes receiving, from the client device, profile information for the user, and generating the matching criteria for the user based on the profile information.

In some implementations, the method includes receiving, from the client device, user content for the user, the user content including at least one of content shared by the user in the social network application or content that the user interacted with in the social network application, processing the user content with at least one machine learning model to determine one or more labels for the user content, and generating the matching criteria for the user based on the one or more labels for the user content.

In some implementations, the data indicative of the match causes the client device to display the match and the one or more categories for the group.

In some implementations, providing the user access to the group in the social network application includes enabling network communication between the user and the group. In some implementations, providing the user access to the group in the social network application includes enabling the user to share content with the group.

In some implementations, the method includes supplying data indicative of the match to at least one client device associated with at least one user in the group, receiving a match acceptance from the at least one client device, and in response to receiving the match acceptance, providing the user access to the group in the social network application.

In some implementations, the one or more categories for the group include a subset of the one or more labels for the content.

In some implementations, the at least one machine learning model is trained based on labeled content received from one or more users of the social network application.

In some implementations, the content includes streamed video content. In some implementations, processing the shared content with the at least one machine learning model to determine the one or more labels for the content includes analyzing the streamed video content in real-time or near-real time. In some implementations, processing the shared content with the at least one machine learning model to determine the one or more labels for the content includes analyzing a copy of the streamed video content after a streaming of the streamed video content has ended.

In general, in an aspect, a computer-implemented method includes, for each of multiple groups in a social network application, accessing content shared within a group, processing the shared content with at least one machine learning model to determine one or more labels for the content, and determining one or more categories for the group based on the one or more labels for the content. The method further includes generating a match between a first group and a second group of the multiple groups based on the one or more categories for each of the first group and the second group, supplying data indicative of the match to each of the first group and the second group, receiving a match acceptance from at least one of the first group or the second group, and in response to receiving the match acceptance, combining the first group and the second group.

In general, in an aspect, a system includes one or more processors and one or more storage devices storing instructions executable by the one or more processors to perform operations including, for each of multiple groups in a social network application, accessing content shared within a group, processing the shared content with at least one machine learning model to determine one or more labels for the content, and determining one or more categories for the group based on the one or more labels for the content, generating a match between a first group and a second group of the multiple groups based on the one or more categories for each of the first group and the second group, supplying data indicative of the match to each of the first group and the second group, receiving a match acceptance from at least one of the first group or the second group, and in response to receiving the match acceptance, combining the first group and the second group.

In general, in an aspect, one or more non-transitory computer-readable storage media store instructions executable by one or more processors to perform operations including, for each of multiple groups in a social network application, accessing content shared within a group, processing the shared content with at least one machine learning model to determine one or more labels for the content, and determining one or more categories for the group based on the one or more labels for the content, generating a match between a first group and a second group of the multiple groups based on the one or more categories for each of the first group and the second group, supplying data indicative of the match to each of the first group and the second group, receiving a match acceptance from at least one of the first group or the second group, and in response to receiving the match acceptance, combining the first group and the second group.

In some implementations, the content includes at least one of text, audio, image, or video data shared within the group.

In some implementations, the group includes one or more users of the social network application, and the content includes content shared by at least one of the one or more users in a communication channel associated with the group.

In some implementations, the communication channel includes at least one of a group chat, a group web page, or a group streaming channel.

In some implementations, the at least one machine learning model is selected from multiple machine learning models based on a type of the content, with the type of content comprising at least one of text, audio, image, or video.

In some implementations, the data indicative of the match comprises a prompt to combine the first group and the second group.

In some implementations, combining the first group and the second group includes adding members of the first group to the second group, or creating a third group with the members of the first group and members of the second group.

In some implementations, the content includes streamed video content. In some implementations, processing the shared content with the at least one machine learning model to determine the one or more labels for the content includes analyzing the streamed video content in real-time or near-real time. In some implementations, processing the shared content with the at least one machine learning model to determine the one or more labels for the content includes analyzing a copy of the streamed video content after a streaming of the streamed video content has ended.

DESCRIPTION OF DRAWINGS

Like reference symbols in the various drawings indicate like elements.

DETAILED DESCRIPTION

The technology described here uses artificial intelligence and machine learning techniques to automatically categorize groups of users in a social network based on the content that they share. In particular, content shared among a group of users is analyzed to identify one or more labels that characterize the content. The identified labels are then used to assign one or more categories to the group, with the categories representing the topics that are relevant to the group. In some implementations, content shared by an individual user can be analyzed using similar techniques to identify labels for the content and categorize the user based on the identified labels. Once the groups (and, optionally, the users) have been categorized, the categories can be used to propose matches between groups or users and groups (e.g., to propose a group to a user, to propose a user to a group, or to propose a group to another group). By extracting topics that are relevant to a group based on content shared within the group, the quality of matches between users and groups is improved relative to techniques that rely on user-defined categories for groups (or do not categorize groups at all), thereby improving matching and social network technologies. In addition, by identifying matches between groups, multiple groups that share similar content can be consolidated, thereby reducing duplication within the social network.

Figure 1:
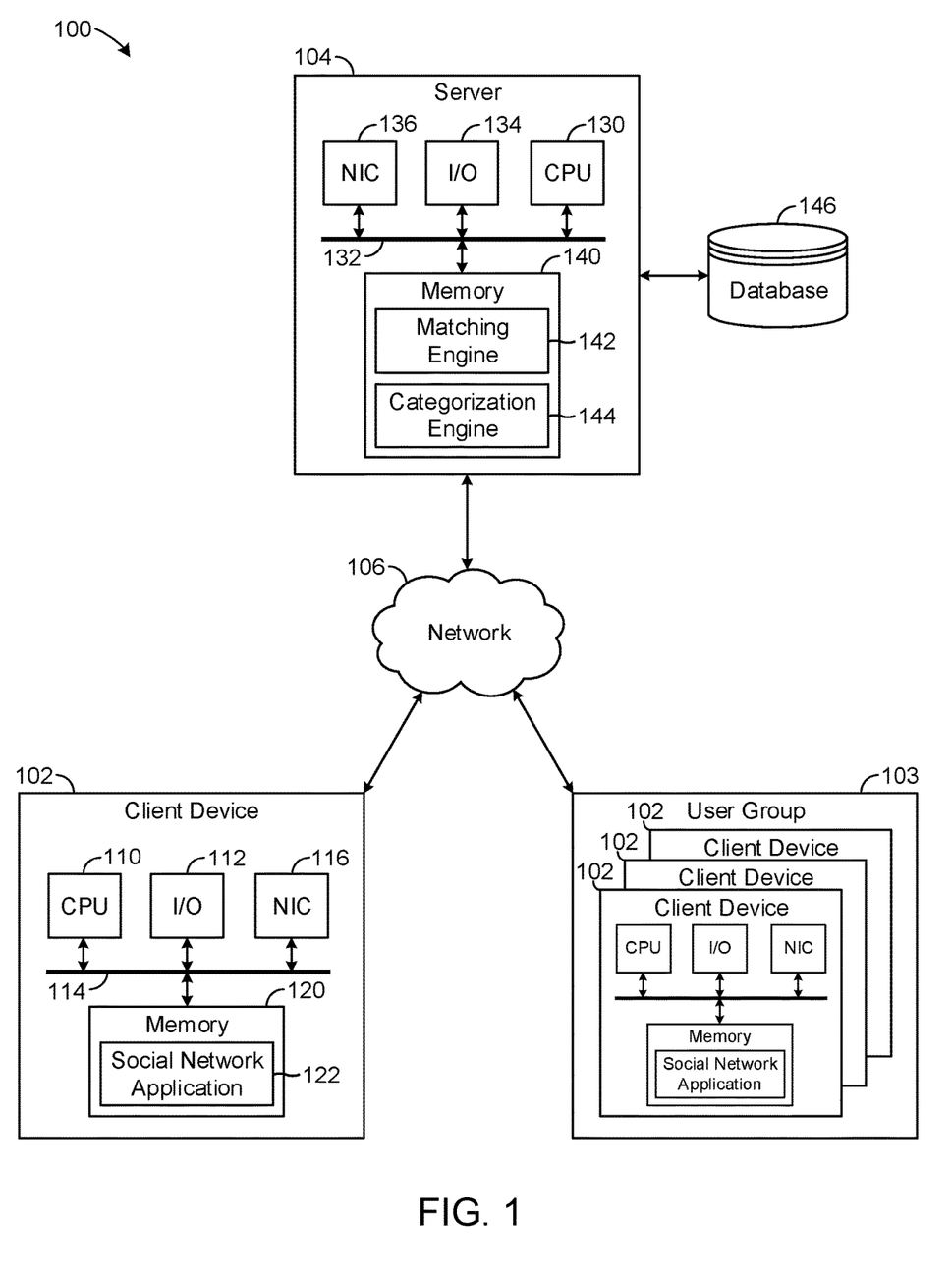
FIG. 1 illustrates an example social network system.

FIG. 1 illustrates a social network system 100 in accordance with an aspect of the present disclosure. The system 100 includes a plurality of client devices 102 in communication with a server 104 via a network 106, which may be a wired network, a wireless network, or any combination thereof. Each client device 102 can be a mobile device (e.g., a smartphone, laptop, tablet, wearable device, etc.) or another computing device that includes at least one processor 110 in communication with input/output devices 112 via a bus 114. The input/output devices 112 can include a touch display, keyboard, mouse, and the like. A network interface circuit 116 is also connected to the bus 114 to provide wired and/or wireless connectivity to the network 106. A memory or other storage medium 120 connected to the bus 114 stores instructions executable by the processor 110. In particular, the memory 120 stores instructions for a social network application 122 that allows a user of a client device 102 to connect and communicate with other users of the social network application 122. The social network application 122 can also enable a user to create, join, participate in, or leave one or more user groups 103 managed by the system 100.

The server 104 includes a processor 130, a bus 132, input/output devices 134 and a network interface circuit 136 to provide connectivity to the network 106. A memory 140 is connected to the bus 132. The memory 140 stores a matching engine 142 and a categorization engine 144 with instructions executed by the processor 130 to implement operations disclosed in connection with FIGS. 2 through 4. In some implementations, the system 100 includes a database 146 in communication the server 104 that stores information for use by the social network application 122, the matching engine 142, and/or the categorization engine 144, such as user profile information, group information, user content, group content, or other information.

In operation, a user of a client device 102 can create a personal profile to participate in the social network application 122. For example, a user can create a personal profile by interacting with a user interface to provide profile information, such as their name, age, biographical text, photographs or videos, and a range of other fields (e.g., city, links to social media profiles on other networks, etc.) that allow the user to characterize themselves. Each user can also specify their interests for use in identifying potential matches (e.g., as potential friends, business partners, or dating partners, among others). For example, a user can specify their interests by interacting with a user interface to provide various criterion that the user is looking for in a potential match, such as age, location, hobbies, or combinations of them, among others. In some implementations, the system 100 (e.g., the matching engine 142 and/or the categorization engine 144) can identify one or more of a user's interests instead of or in addition to those specified by the user based on, for example, analysis of the content that the user has shared or interacted with. The system 100 (e.g., the matching engine 142 and/or the categorization engine 144) can use the interests to generate matching criteria for use in identifying potential matches for the user.

Once a profile is complete, a user can begin to view the profiles of other users or user groups, while the user's own profile is circulated among the user base. In general, a user group is a collection of one or more users of the social network application 122. Users can belong to none, one, or many user groups, and can create, join, participate in, or leave user groups through interaction with the social network application 122. Each group can include one or more communication channels managed by the system 100 and accessible through the social network application 122 that enable users in the group (sometimes referred to as "members" of the group) to share content with one another. For example, each user group can include a messaging system (e.g., a group chat), a web page (e.g., an online forum or other interactive group page), a streaming media channel (e.g., a live audio or video streaming channel), a virtual environment (e.g., a three-dimensional computer-simulated environment), or combinations of them, among others, that allow members of the group to share various forms of content with one another. In some implementations, access to one or more features of the group, such as one or more of the group's communication channels, can be restricted to members of the group.

In some implementations, a member of a group, such as the creator of the group or a moderator of the group, can create a profile for the group to provide prospective members with insight into the relevant topics, interests, or goals of the group. For example, a member of a group can interact with the social network application 122 to provide profile information for the group, such as a group name, a short description of the group, photographs or videos for the group, and a range of other fields that characterize the group. In some implementations, a member of a group can assign one or more user-defined labels or tags to the group. However, the user-defined labels and other profile information for a group may not fully or accurately characterize the relevant topics for the group. In addition, the relevant topics for a group may change over time, rendering previously-defined labels and other profile information inaccurate or incomplete. Thus, self-categorization of groups in this way can mislead prospective group members and reduce the quality of matches generated based on this information.

To improve the categorization of user groups, the system 100 (e.g., the categorization engine 144) can automatically categorize a group based on the content shared in or by the group. For example, the categorization engine 144 can receive content, such as text, audio, image, or video content, that is shared in a group chat, on a group web page, through a group streaming channel, in a virtual group environment, or over another communication channel for the group. The categorization engine 144 can then process the received content using artificial intelligence and/or machine learning techniques, such as those discussed herein, to determine one or more labels for the content. Based on the labeled content, the categorization engine 144 can assign one or more categories to the group. The assigned categories can represent the topics that are relevant to the group. In some implementations, the categorization engine 144 can also receive and analyze content shared by an individual user of the social network application to determine labels for the content and categorize the user based on the identified labels. In some implementations, the categories assigned to a user are included as matching criteria for the user.

After categorizing the groups (and, optionally, the users), the system 100 can use the categories to identify potential matches between groups and/or users and groups. For example, the matching engine 142 can process the categories assigned to groups to identify those groups that are sufficiently similar and therefore should be matched or merged. The matching engine 142 can also process the categories assigned to groups to identify those groups that satisfy the matching criteria associated with a user. In general, the matching engine 142 can use filters, applied rules, artificial intelligence, machine learning, or combinations of them, among others, to identify potential matches between a user and a group. For example, the matching engine 142 can generate one or more filters or rules based on the matching criteria associated with a user, and can apply the filters or rules to categories assigned to groups to identify potential matches between the user and a group of users. As another example, the matching engine 142 can apply rules to identify groups that have a sufficient number of categories in common in order to identify matches between groups.

After identifying one or more potential matches between groups or a user and a group, the matching engine 142 can provide information about the potential matches to the user and/or the group(s) of users for review. For example, the matching engine 142 can provide a user with a profile for a matched group that includes the profile information and/or categories associated with matched group, and the social network application 122 executing on the user's client device 102 can cause display of a graphical user interface (GUI) that allows the user to view and explore the group's profile. As another example, the matching engine 142 can provide some or all members of a group with a profile of a matched user or group that includes the profile information and/or categories associated with the matched user or group, and the social network application 122 executing on the respective member's client device 102 can cause display of a GUI that allows the member to view and explore the user's or group's profile.

To ascertain a mutual agreement to connect groups or a user and a group, the profile of each of the groups or the user and the group can be voted on. For example, having viewed the profile of a group, the user can vote 'yes' if they would like to connect with the group, or vote 'no' if they are not interested in connecting. In some implementations, a user can vote 'yes' by interacting with a first user interface button or swiping (e.g., clicking and dragging the profile using their finger) the profile off the screen in a certain direction (e.g., right), and can vote 'no' by interacting with a second user interface button or swiping in another direction (e.g., left). In some implementations, once a user has voted 'yes' to connect with a group, the matching engine 142 can place the profile of the user into the queue of profiles to be viewed by some or all of the members of the group. Through this mechanism the matching engine 142 is able to accelerate the pace with which users and groups view each other's profiles than would happen in a purely organic system of profile selection.

When a user votes 'yes' on a group, or when a user and a group mutually vote 'yes,' a connection (sometimes referred to as a "match") is established between the user and the group. Once a match is established, the system 100 can add the user to the group and provide the user with access to the group's communication channel(s) and other features (e.g., those features that are restricted to members of the group). In some implementations, the matching engine 142 can supply a notification of the match to either or both of the matched parties with a prompt to contact the other matched party. On the other hand, when one party votes 'yes' but the other votes 'no,' no further connection is established between the user and the group, and their profiles are not shown to each other again (or they may be shown again depending on changes within their profile, location, search parameters, or because of time elapsed).

Similarly, a match between groups can be established when one or both groups vote 'yes' on one another. Once a match between groups is established, the system 100 can supply a notification of the match to some or all members of the matched groups. In some implementations, the notification can include a prompt to merge or consolidate the groups into a singular group. In response to the prompt, members of the respective groups (or a designated member from each group, such as a group creator or moderator) can vote to consolidate the groups or maintain separate groups. In response to a vote to consolidate the group, the system 100 can add the members of one group into the other, or can create a new group with the members from each group. By consolidating groups in this way, duplication of groups and group content within the social network can be reduced, thereby reducing the consumption of computing resources used within the network. In addition, consolidating groups enhances the user experience within the social network by quickly connecting a large number of like-minded users.

Figure 2:
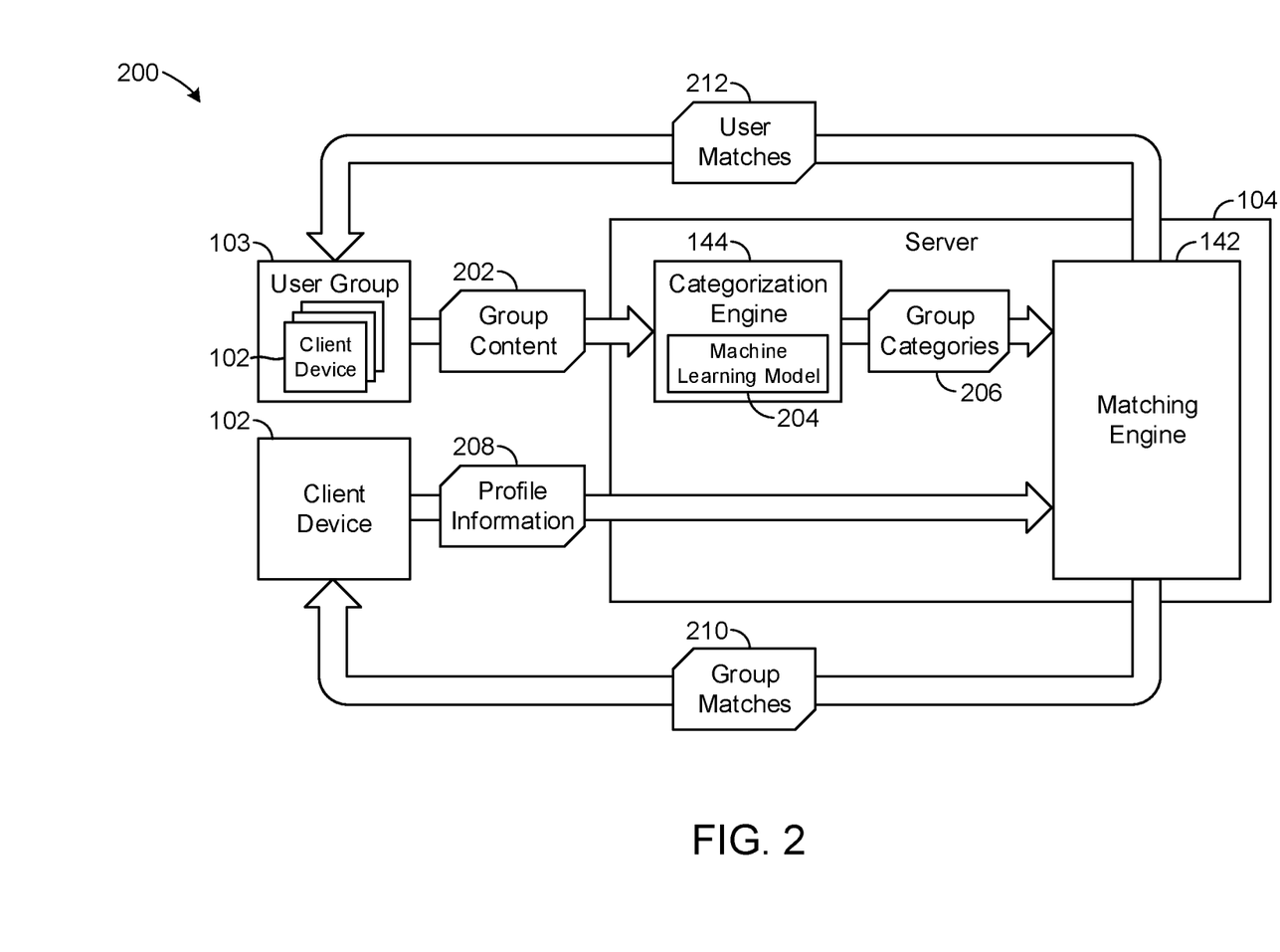
FIG. 2 illustrates an example system for automated categorization of groups.

FIG. 2 illustrates an example system 200 for automatically categorizing groups of users in accordance with an aspect of the present disclosure. In this example, group content 202 is shared in or by a user group 103. The group content 202 can include text content, audio content, image content, video content, or combinations of them, among other synchronous or asynchronous content that is shared within the group 103, such as in a group chat, on a group web page, through a group streaming channel, in a virtual group environment, or over another communication channel for the group 103.

The categorization engine 144 receives the group content 202 shared within the group 103. For example, the categorization engine 200 can receive the group content 202 when it is shared within the group 103 using the social network application 122. The categorization engine 144 processes the group content 202 using one or more artificial intelligence and/or machine learning techniques to determine one or more labels that characterize the group content 202. For example, the categorization engine 144 can include one or more supervised, semi-supervised, or unsupervised machine learning models 204 configured to determine one or more labels for the group content 202 by classifying, clustering, or otherwise categorizing the content. Examples of algorithms implemented by the one or more machine learning models 204 include neural networks, decision trees, support vector machines, naïve bayes, k-nearest neighbor, (fuzzy) k-means, random forest classifiers, gradient boosting, hierarchical clustering, regressions, or combinations of them, among others. In some implementations, one or more of the models 204 are trained using labeled content received from groups and/or users.

In some implementations, the classification engine 144 selects a machine learning model 204 for processing the group content 202 based on the type of content 202 being analyzed (e.g., text, audio, image, video, etc.). For example, if image content 202 is being analyzed, then the categorization engine 144 can process the content 202 using a model 204 configured to identify objects within the image. One or more labels for the image content 202 can then be determined based on the identified objects. Similar techniques can be used to analyze recorded or streamed video content 202. For example, the categorization engine 144 can sample frames of the video (e.g., 1 in every 10 frames) and can identify objects within the sampled frames in order to determine one or more labels for the video content 202. If the video content 202 is streamed, the categorization engine 144 can analyze the streamed content 202 in real or near-real time, or can analyze a stored copy of the content 202 after the stream has ended. The categorization engine 144 can also analyze textual content 202 (e.g., text chat content) using, for example, a natural language processing model 204 configured to identify keywords and/or analyze the intent or sentiment of the text in order to determine one or more labels for the content 202. In some implementations, the content 202 can include a combination of text, audio, image, video and/or other types of content, and the categorization engine 144 can use one or more models 204 to determine the labels for the combined content.

The categorization engine 144 uses the determined labels for the content 202 to assign one or more categories 206 to the group 103. The categories 206 can represent the relevant topics for the group 103. In some implementations, the categorization engine 144 can assign all of the labels as categories 206 for the group 103. In some implementations, the categorization engine 144 can assign a subset of the labels as categories 206 for the group 103, such as a subset of labels that appear more than a threshold number of times, or a subset of the most common labels (e.g., the top five most common labels based on analysis of some or all of the content 202 shared within the group).

In some implementations, the categorization engine 144 can determine categories 206 for the group 103 based on analysis of the labels. For example, if analysis of the content 202 shared within the group 103 yields labels including "car" and "Lewis Hamilton," then the categorization engine 144 can infer that "Formula 1" is a relevant category 206 for the group. On the other hand, if analysis of the content 202 shared within the group 103 yields labels including "car" and "oil filter," then the categorization engine 144 can infer that "auto repair" is a relevant category 206 for the group. To determine the categories 206 from the labels, the categorization engine 144 can use one or more machine learning models (e.g., one or more of the machine learnings models 204) or other categorization techniques described herein. The categories 206 assigned to the group 103 can be updated over time as additional content 202 is shared within the group.

In some implementations, the categorization engine 144 can generate a signature for the group 103 using the categories 206 assigned to the group. For example, the categorization engine 144 can create a list of some or all of the categories 206 assigned to the group 103, which can serve as a unique signature of the relevant topics for the group. In some implementations, the categorization engine 144 can generate a tree or other relational model from the categories 206 to serve as the signature for the group 103. Such a model can include nodes representing the categories (and/or subcategories) assigned to the group and edges representing relationships between the nodes. For instance, in the example above, the categorization engine 144 can generate a signature for the group 103 in the form of a tree that includes a parent category "Formula 1" connected to subcategories "car" and "Lewis Hamilton."

The categorization engine 144 can provide the categories 206 for the group 103 to the matching engine 142. The matching engine 142 can also receive profile information 208 for a user from the social network application 122 executing on the user's device 102 (or from the database 146 if previously stored), and can generate matching criteria for the user based on the profile information 208. In some implementations, the matching engine 142 can also receive additional information for use in identifying matches, such as profile information for the group (not shown). The matching engine 142 can process the categories 206 assigned to groups 103 to identify those groups that satisfy the matching criteria associated with a user. In general, the matching engine 142 can use filters, applied rules, artificial intelligence, machine learning, or combinations of them, among others, to identify potential matches between a user and a group.

If a potential match is identified, the matching engine 142 can transmit information about the matched group 210 to the user. For example, the matching engine 142 can provide a user with a profile for a matched group 210 that includes the profile information and/or categories associated with matched group, and the social network application 122 executing on the user's client device 102 can cause display of a GUI that allows the user to view and explore the group's profile. In some implementations, the matching engine 142 can provide some or all members of a group with a profile of a matched user 212, and the social network application 122 executing on the respective member's client device 102 can cause display of a GUI that allows the member to view and explore the user's profile.

The user and, in some implementations, the group can vote on the proposed match 210, 212 between the user and the group. If a user and a group both accept the proposed match, the matching engine 142 can add the user to the group 103 and enable access to the group's communication channels and other features.

Figure 3:
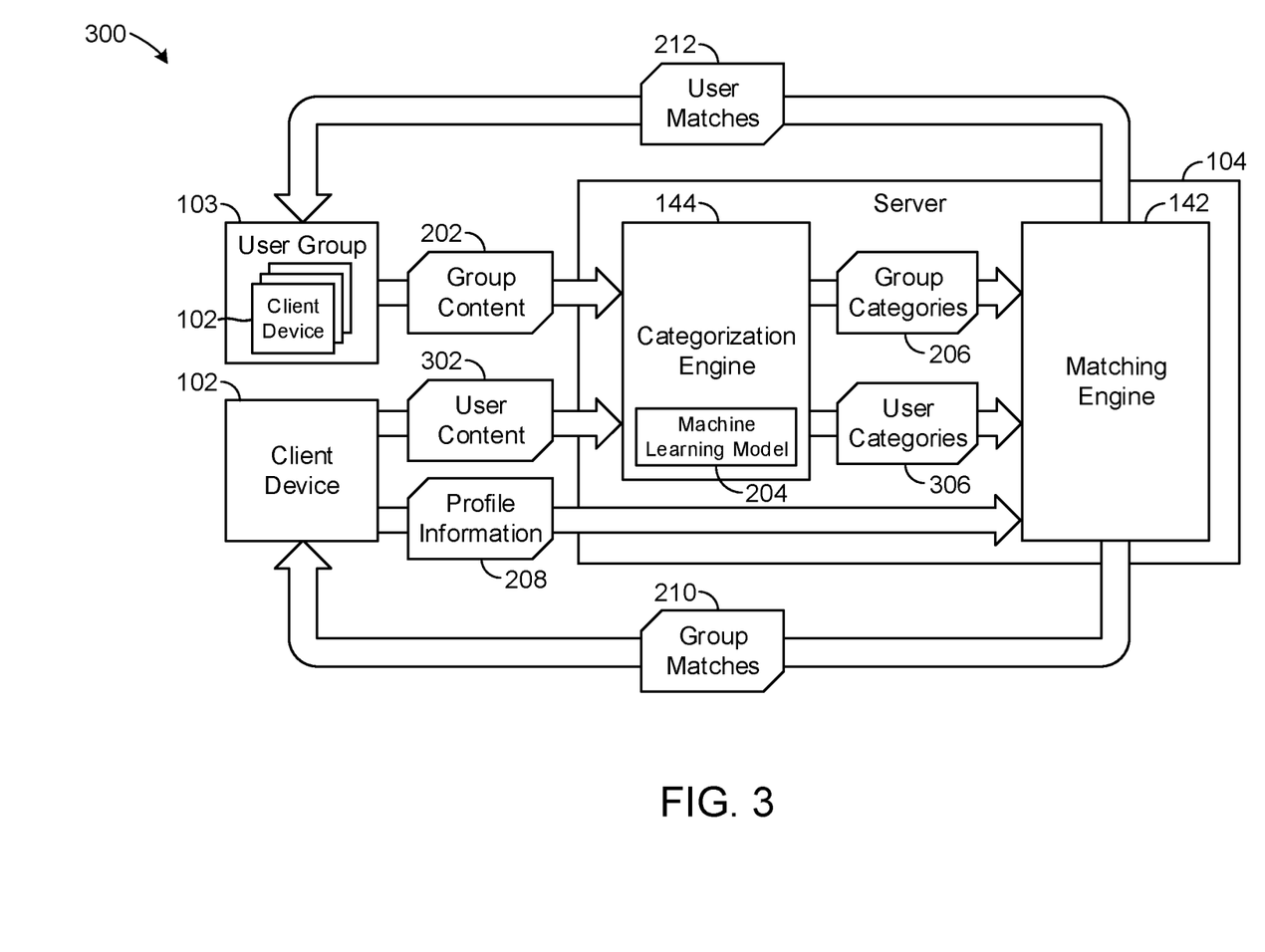
FIG. 3 illustrates an example system for automated categorization of groups and users.

FIG. 3 illustrates an example system 300 for automatically categorizing users and groups of users in accordance with an aspect of the present disclosure. The system 300 is substantially similar to the system 200 shown in FIG. 2. However, in addition to analyzing the group content 202 to determine categories 206 for the group 103, the system 300 analyzes user content 302 in order to assign one or more categories 306 to the user of the client device 102. In general, the user content 302 can include text content, audio content, image content, video content, or combinations of them, among other synchronous or asynchronous content that a user shares or interacts with in the social network application 122.

The categorization engine 144 can receive and process the user content 302 with the one or more machine learning models 204 to determine labels that characterize the content 302. In some implementations, the categorization engine 144 can process the profile information 208 associated with the user in addition to the content 302 to determine the labels. The categorization engine 144 uses the determined labels to assign one or more categories 306 to the user, with the categories 306 representing the topics that are relevant to the user. For example, the categorization engine 144 can assign all of the labels as categories 306 for the user, a subset of the labels as categories 306 for the user, or can determine categories 306 for the user based on analysis of the labels. In some implementations, the categorization engine 144 can generate a signature for the user based on the categories 306 for the user.

The categorization engine 144 can provide the categories 206 for the group 103 and the categories 306 for the user to the matching engine 142. In some implementations, the matching engine 142 can also receive the profile information 208 for the user. The matching engine 142 can derive matching criteria for the user from the categories 306 and/or the profile information. The matching engine 142 can process the categories 206 assigned to groups 103 to identify those groups that satisfy the matching criteria associated with a user, as described herein.

In some implementations, the matching engine 142 can compare the categories 206 for the group 103 and the categories 306 for the user to identify matches. For example, the matching engine 142 can identify whether the categories 306 for the user (or the signature formed from the categories 306) match at least some of the categories 206 for the group (or the signature formed from the categories 206). If there is an exact match between the categories 206, 306 or the signatures formed therefrom, then the matching engine 142 can determine that the user and the group are a match. The matching engine 142 can also determine that the user and the group are a match if there is a partial match between the categories 206, 306 (and/or signatures) that exceeds a threshold level, such as a match among at least 50% of the categories (and/or signatures). On the other hand, the matching engine 142 can determine that there is no match between the user and the group if the categories 206, 306 (and/or signatures) do not satisfy the threshold level of similarity.

If a potential match is identified, the matching engine 142 can transmit information about the matched group 210 to the user or information about the matched user 212 to the group, or both. The user and, in some implementations, the group can vote on the proposed match 210, 212 between the user and the group. If a user and a group both accept the proposed match, the matching engine 142 can add the user to the group 103 and enable access to the group's communication channels and other features.

Figure 4:
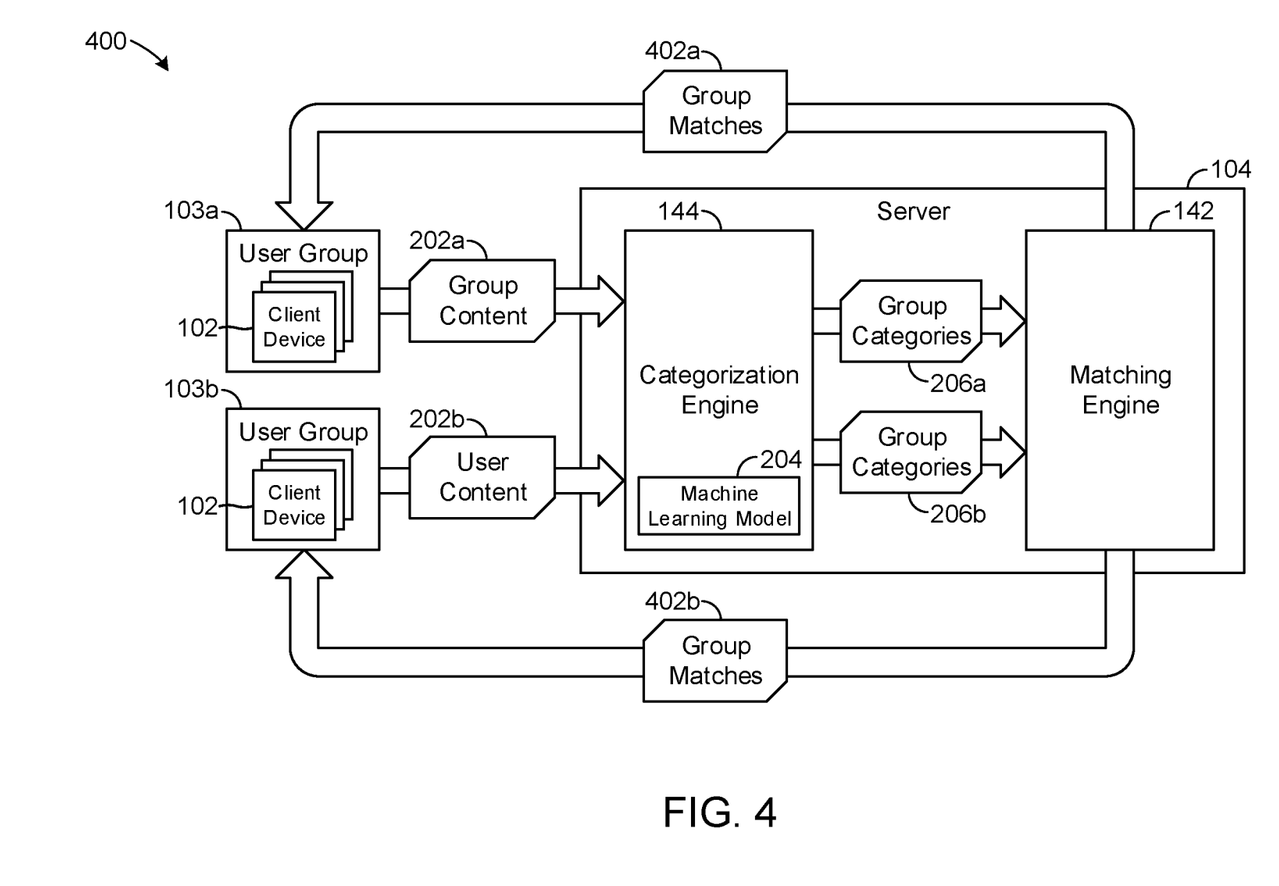
FIG. 4 illustrates an example system for automated categorization of groups.

FIG. 4 illustrates an example system 400 for automatically categorizing groups of users in accordance with an aspect of the present disclosure. The system 400 is substantially similar to the systems 200 and 300 shown in FIGS. 2 and 3. However, in this example, the system 400 generates matches 402a, 402b between groups 103a and 103b based on the group content 202a, 202b shared within the respective groups. To generate the matches 402a, 402b between the groups 103a, 103b, the matching engine 142 receives the categories 206a, 206b assigned to the groups and identifies exact or partial matches between the categories 206a, 206b (or signatures formed from the categories). If a match is identified, the matching engine 142 can transmit information about the match to some or all members of the matched groups. In some implementations, the matching engine 142 can prompt members of the respective groups (e.g., a designated member from each group, such as a group creator or moderator) to merge or consolidate the groups into a singular group. If a vote to consolidate the groups is received, the system 100 can add the members of one group into the other, or can create a new group with the members from each group. In this way, duplication of groups 106a, 106b and group content 202a, 202b within the system 400 can be reduced, thereby reducing the consumption of computing resources by the system 400.

Figure 5:
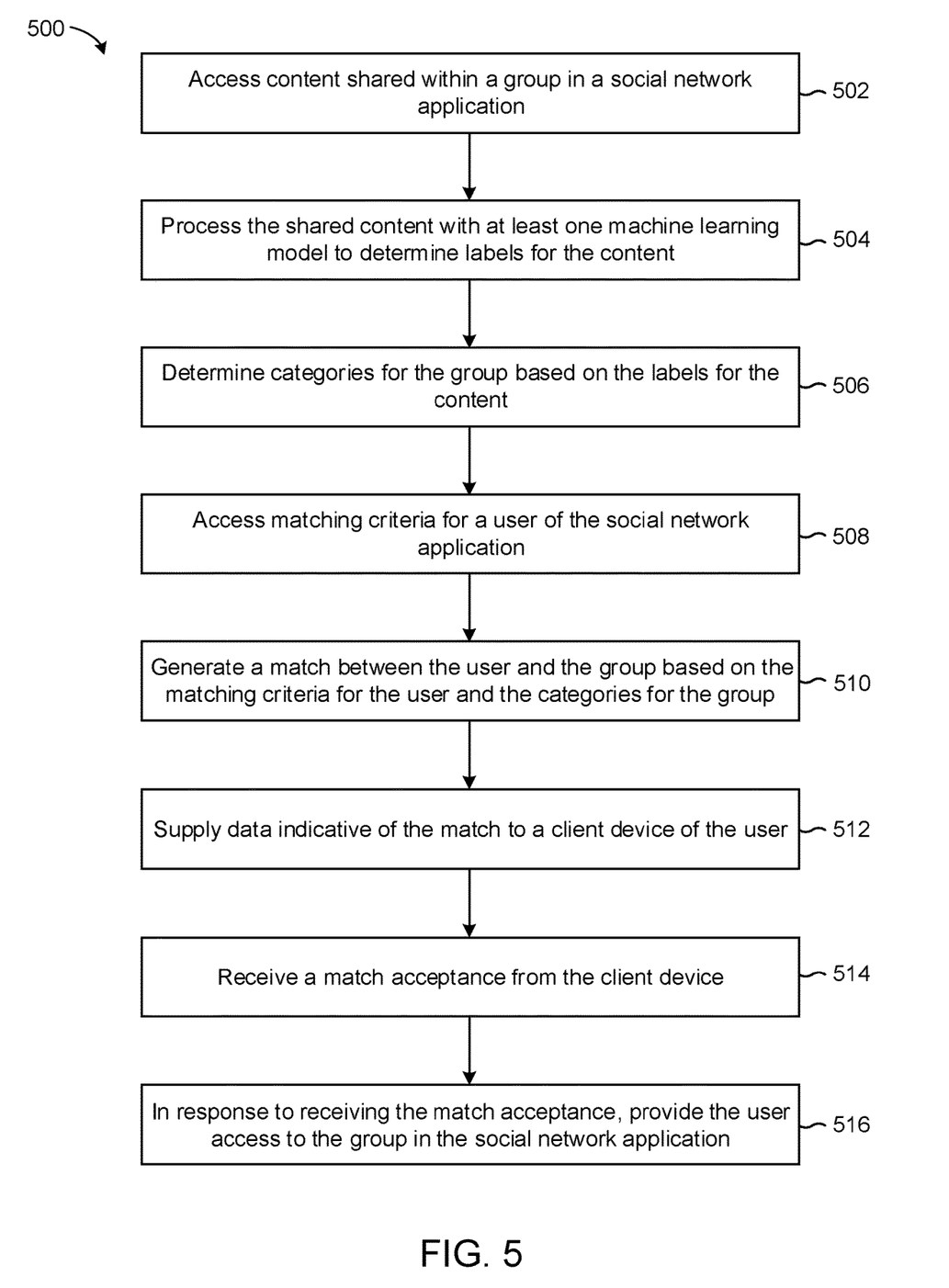
FIGS. 5-6 illustrate processing operations.

FIG. 5 illustrates an example process 500 for automatically categorizing groups of users and generating matches between groups and users. In some examples, the process 500 is performed by one or more of the devices or systems described here, such as the client devices 102, the server 104, or the systems 100, 200, 300, and/or 400, that include at least one processor and at least one computer-readable storage medium storing instructions executable by the at least one processor to perform the process 500.

Operations of the process 500 include accessing 502 content shared within a group in a social network. The group can include one or more users of the social network application, and the content can be shared by at least one of the one or more users in a communication channel associated with the group. In some implementations, the communication channel includes at least one of a group chat, a group web page, or a group streaming channel. In some implementations, the content includes at least one of text, audio, image, or video data shared within the group.

The shared content is processed 504 with at least one machine learning model to determine one or more labels for the content. Based on the one or more labels for the content, one or more categories for the group are determined 506. The at least one machine learning model can be trained based on labeled content received from one or more users of the social network application. In some implementations, the at least one machine learning model is selected from a plurality of machine learning models based on a type of the content, with the type of content comprising at least one of text, audio, image, or video. The one or more categories for the group can include all or a subset of the one or more labels for the content, or can be derived based on analysis of the one or more labels.

At 508, matching criteria for a user of the social network application is accessed. In some implementations, profile information for the user can be received (e.g., from a client device operated by the user), and matching criteria can be generated for the user based on the profile information. In some implementations, user content for the user is received, the user content including at least one of content shared by the user in the social network application or content that the user interacted with (e.g., viewed, liked, shared, etc.) in the social network application. The user content can be processed with at least one machine learning model to determine one or more labels for the user content, and matching criteria for the user can be generated based on the one or more labels.

A match between the user and the group is generated 510 based on the matching criteria for the user and the one or more categories for the group. In response to the match, data indicative of the match is supplied 512 to a client device of the user. The data indicative of the match can cause the client device to display the match and the one or more categories for the group.

A match acceptance is received 514 from the client device. In response to the match acceptance, the user is provided 516 access to the group in the social network application. In some implementations, providing the user access to the group in the social network application includes enabling network communication between the user and the group. In some implementations, providing the user access to the group in the social network application includes enabling the user to share content with the group (e.g., via one or more communication channels for the group). In some implementations, data indicative of the match is supplied to at least one client device associated with at least one user in the group. A match acceptance is received from the at least one client device, and, in response, the user is provided access to the group in the social network.

Figure 6:
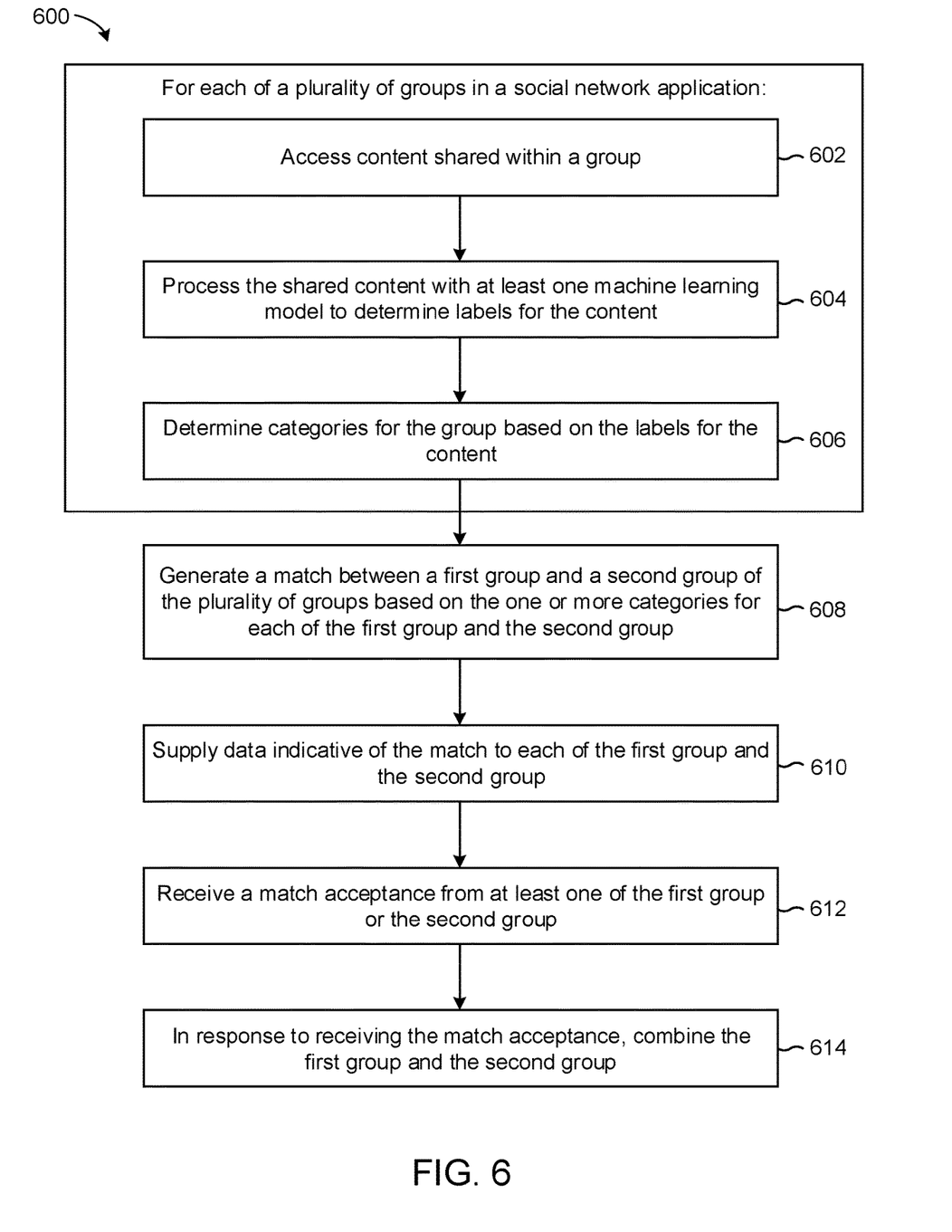

FIG. 6 illustrates an example process 600 for automatically categorizing groups of users and generating matches between groups. In some examples, the process 600 is performed by one or more of the devices or systems described here, such as the client devices 102, the server 104, or the systems 100, 200, 300, and/or 400, that include at least one processor and at least one computer-readable storage medium storing instructions executable by the at least one processor to perform the process 600.

Operations of the process 600 include, for each of a plurality of groups in a social network application: accessing 602 content shared within a group, processing 604 the shared content with at least one machine learning model to determine one or more labels for the content, and determining 606 one or more categories for the group based on the one or more labels for the content.

Each of the plurality of groups can include one or more users of the social network application, and the content can be shared by at least one of the one or more users in a communication channel associated with a particular group. In some implementations, the communication channel includes at least one of a group chat, a group web page, or a group streaming channel. In some implementations, the content includes at least one of text, audio, image, or video data shared within the group.

The at least one machine learning model can be trained based on labeled content received from one or more users of the social network application. In some implementations, the at least one machine learning model is selected from a plurality of machine learning models based on a type of the content, with the type of content comprising at least one of text, audio, image, or video. The one or more categories for the group can include all or a subset of the one or more labels for the content, or can be derived based on analysis of the one or more labels.

At 608, a match between a first group and a second group of the plurality of groups is generated based on the one or more categories for each of the first group and the second group. In response, data indicative of the match is supplied 610 to each of the first group and the second group. For example, data indicative of the match can be supplied to some or all of the members of the first and second groups, or to a designated member (e.g., a creator or moderator) of the first and second groups. In some implementations, the data indicative of the match can include a prompt to combine the first group and the second group.

A match acceptance is received 612 from at least one of the first group or the second group. In response to receiving the match acceptance, the first group and the second group are combined 614. In some implementations, combining the first group and the second group includes adding members of the first group to the second group (or vice versa). In some implementations, combining the first group and the second group includes creating a third group with the members of the first group and the members of the second group (and, optionally, removing the first and second groups from the social network application).

The approaches described here can be implemented at least in part using a computer storage product with a computer readable storage medium having computer code thereon for performing various computer-implemented operations. The media and computer code may be those specially designed and constructed for the purposes of the approaches described here, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, the approaches described here may be implemented using JAVA®, C++, or other programming language and development tools. In some examples, the approaches described here may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the approaches described here. Thus, the foregoing descriptions of specific embodiments are presented for purposes of illustration and description. They are not intended to be exhaustive or to limit the invention to the precise forms disclosed; obviously, many modifications and variations are possible in view of the above teachings. The embodiments were chosen and described in order to best explain the principles of the approaches described here and its practical applications, they thereby enable others skilled in the art to best utilize the approaches described here and various embodiments with various modifications as are suited to the particular use contemplated. Other implementations not specifically described here are also within the scope of the following claims.

What is claimed is:

1. A computer-implemented method, comprising:
   accessing content shared within a first group in a social network application;
   processing the shared content with at least one machine learning model to determine one or more labels for the content;
   determining one or more categories for the first group based on the one or more labels for the content;
   accessing one or more categories for a second group of the social network application;
   generating a match between the first group and the second group based on the one or more categories for the first group and the one or more categories for the second group;
   supplying data indicative of the match to a client device of a user in the second group;
   receiving a match acceptance from the client device; and
   in response to receiving the match acceptance, combining the first group and the second group in the social network application.

2. The method of claim 1, wherein the content comprises at least one of text, audio, image, or video data shared within the first group.

3. The method of claim 1, wherein the first group comprises two or more users of the social network application, and wherein the content comprises content shared by at least one of the two or more users in a communication channel associated with the first group.

4. The method of claim 3, wherein the communication channel comprises at least one of a group chat, a group web page, or a group streaming channel.

5. The method of claim 1, wherein the at least one machine learning model is selected from a plurality of machine learning models based on a type of the content, with the type of content comprising at least one of text, audio, image, or video.

6. The method of claim 1, further comprising:
   in response to receiving the match acceptance, providing the user in the second group access to the first group in the social network application,
   wherein providing the user in the second group access to the first group in the social network application comprises enabling network communication between the user in the second group and the first group or enabling the user in the second group to share content with the first group.

7. The method of claim 1, further comprising:
   supplying data indicative of the match to at least one client device associated with at least one user in the second group;
   receiving a match acceptance from the at least one client device; and
   in response to receiving the match acceptance, providing the user in the second group access to the first group in the social network application.

8. The method of claim 1, wherein the one or more categories for the first group comprise a subset of the one or more labels for the content.

9. The method of claim 1, wherein the at least one machine learning model is trained based on labeled content received from one or more users in the first group of the social network application.

10. The method of claim 1, wherein the content comprises streamed video content, and wherein processing the shared content with the at least one machine learning model to determine the one or more labels for the content comprises:
  analyzing the streamed video content in real-time or near-real time, or
  analyzing a copy of the streamed video content after a streaming of the streamed video content has ended.

11. A computer-implemented method, comprising:
  for each of a plurality of groups in a social network application:
    accessing content shared within a group;
    processing the shared content with at least one machine learning model to determine one or more labels for the content; and
    determining one or more categories for the group based on the one or more labels for the content;
  generating a match between a first group and a second group of the plurality of groups based on the one or more categories for each of the first group and the second group;
  supplying data indicative of the match to each of the first group and the second group;
  receiving a match acceptance from at least one of the first group or the second group; and
  in response to receiving the match acceptance, combining the first group and the second group, wherein each of the first group and the second group comprise two or more users.

12. The method of claim 11, wherein the content comprises at least one of text, audio, image, or video data shared within the group.

13. The method of claim 11, wherein the content comprises content shared by at least one of the two or more users in a communication channel associated with the group.

14. The method of claim 13, wherein the communication channel comprises at least one of a group chat, a group web page, or a group streaming channel.

15. The method of claim 11, wherein the at least one machine learning model is selected from a plurality of machine learning models based on a type of the content, with the type of content comprising at least one of text, audio, image, or video.

16. The method of claim 11, wherein the data indicative of the match comprises a prompt to combine the first group and the second group.

17. The method of claim 11, wherein combining the first group and the second group comprises adding members of the first group to the second group, or creating a third group with the members of the first group and members of the second group.

18. The method of claim 11, wherein the content comprises streamed video content, and wherein processing the shared content with the at least one machine learning model to determine the one or more labels for the content comprises:
  analyzing the streamed video content in real-time or near-real time, or
  analyzing a copy of the streamed video content after a streaming of the streamed video content has ended.

* * * * *